US012306562B2

(12) United States Patent
Miyauchi et al.

(10) Patent No.: US 12,306,562 B2
(45) Date of Patent: *May 20, 2025

(54) HEATING DEVICE AND FIXING DEVICE AND IMAGE FORMING APPARATUS

(71) Applicants: Kabushiki Kaisha Toshiba, Tokyo (JP); Toshiba Tec Kabushiki Kaisha, Tokyo (JP)

(72) Inventors: Chie Miyauchi, Odawara Kanagawa (JP); Osamu Takagi, Tokyo (JP); Kazuhiko Kikuchi, Yokohama Kanagawa (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 41 days.

This patent is subject to a terminal disclaimer.

(21) Appl. No.: 18/310,729

(22) Filed: May 2, 2023

(65) Prior Publication Data

US 2023/0266701 A1 Aug. 24, 2023

Related U.S. Application Data

(63) Continuation of application No. 16/984,488, filed on Aug. 4, 2020, now Pat. No. 11,675,294, which is a
(Continued)

(30) Foreign Application Priority Data

Jun. 20, 2016 (JP) .................................. 2016-121406
Mar. 24, 2017 (JP) .................................. 2017-059625

(51) Int. Cl.
*G03G 15/20* (2006.01)

(52) U.S. Cl.
CPC ..... *G03G 15/2039* (2013.01); *G03G 15/2021* (2013.01); *G03G 15/2053* (2013.01); *G03G 15/2042* (2013.01)

(58) Field of Classification Search
CPC ........... G03G 15/2021; G03G 15/2039; G03G 15/2042; G03G 15/2053; Y02B 30/00
See application file for complete search history.

(56) References Cited

U.S. PATENT DOCUMENTS 5,171,969 A 12/1992 Nishimura
5,376,773 A 12/1994 Masuda
(Continued)

FOREIGN PATENT DOCUMENTS

EP 2711778 A2 3/2014
JP 2002341682 A 11/2002
(Continued)

OTHER PUBLICATIONS

Extended European Search Report dated Nov. 2, 2017, filed in counterpart European Patent Application No. 17176314, 7 pages.
(Continued)

*Primary Examiner* — Dana Ross
*Assistant Examiner* — Joe E Mills, Jr.
(74) *Attorney, Agent, or Firm* — Kim & Stewart LLP

(57) ABSTRACT

A heating device according to an embodiment generally includes substrate, blocks, and temperature sensors. The blocks are arranged on the substrate with a gap therebetween in a first direction. The temperature sensors are provided for each of the blocks and detect the temperature of the blocks. The block includes a plurality of first blocks on at least one side in the first direction, and the first block is adjacent to two blocks in the first direction, and the temperature sensor detects temperature of a temperature detection region on the
(Continued)

first block, which is closer to the one of the adjacent two blocks being longer in the first direction of the two blocks.

20 Claims, 9 Drawing Sheets

Related U.S. Application Data continuation of application No. 15/624,522, filed on Jun. 15, 2017, now Pat. No. 10,768,559.

(56) References Cited

U.S. PATENT DOCUMENTS

| | | |
|---|---|---|
| 9,261,832 B2 | 2/2016 | Muramatsu |
| 9,354,570 B2 | 5/2016 | Arimoto |
| 9,411,276 B2 | 8/2016 | Takagi |
| 10,768,559 B2 | 9/2020 | Miyauchi |
| 2003/0029853 A1 | 2/2003 | Izawa |
| 2008/0085139 A1 | 4/2008 | Roof |
| 2013/0209125 A1 | 8/2013 | Uchitani |
| 2014/0076878 A1 | 3/2014 | Shimura |
| 2015/0037052 A1 | 2/2015 | Muramatsu |
| 2015/0331372 A1 | 11/2015 | Takagi |
| 2017/0102650 A1 | 4/2017 | Shimura |
| 2017/0363998 A1* | 12/2017 | Takagi .................. H05B 3/26 |
| 2018/0253043 A1 | 9/2018 | Shimura |
| 2020/0363758 A1 | 11/2020 | Miyauchi |

FOREIGN PATENT DOCUMENTS

| | | |
|---|---|---|
| JP | 2010008526 A | 1/2010 |
| JP | 2014059508 A | 4/2014 |
| JP | 2016062024 A | 4/2016 |
| JP | 2017054071 A | 3/2017 |
| WO | 2015141217 A1 | 9/2015 |

OTHER PUBLICATIONS

Japanese Office Action dated Jan. 5, 2021, mailed in counterpart Japanese Application No. 2017-059625, 8 pages (with translation).

* cited by examiner

HEATING DEVICE AND FIXING DEVICE AND IMAGE FORMING APPARATUS

CROSS-REFERENCE TO RELATED APPLICATIONS

This application is a continuation of U.S. patent application Ser. No. 16/984,488, filed on Aug. 4, 2020, which is a continuation of U.S. patent application Ser. No. 15/624,522, filed on Jun. 15, 2017, now U.S. Pat. No. 10,768,559, granted on Sep. 8, 2020, which is based upon and claims the benefit of priority from Japanese Patent Application No. 2016-121406, filed on Jun. 20, 2016 and Japanese Patent Application No. 2017-059625, filed on Mar. 24, 2017; the entire contents of each of which are incorporated herein by reference.

FIELD

Embodiments described herein relate generally to a temperature detection technique in a heating device.

BACKGROUND

Conventionally known as a heating device is a fixing device for heating a sheet using a plate-shaped heat generating member. This fixing device is configured such that the surfaces of the plate-shaped heat generating member and a pressure roller face each other. This fixing device is configured such that the plate-shaped heat generating member is in contact with the inner surface of an endless belt and the opposite surface of the endless belt is in contact with a first surface of a sheet, thereby heating the sheet via the endless belt. This fixing device is also configured such that the pressure roller and the second surface of the sheet are in contact with each other, allowing the plate-shaped heat generating member and the pressure roller to apply pressure thereto. This allows the fixing device to fix a toner image transferred to the sheet onto the sheet.

Some fixing devices employ a ceramic heater as a heat generating member.

A sheet width direction refers to a direction orthogonal to a sheet conveyance direction. In a conventional technique, a plurality of heat generating parts are formed on a ceramic substrate and arranged in a sheet width direction. The conventional technique prevents unnecessary heat generation by controlling the energization of the heat generating parts depending on the size of a sheet to be subjected to a fixing treatment.

According to a first conventional technique, a number of heat generating parts of the same width are formed and arranged in the sheet width direction. The first conventional technique collectively performs ON/OFF control, on the basis of the detected temperature of the endless belt, to the output from a group of heat generating parts located at a location corresponding to the size of an image to be formed.

In the first conventional technique, since the temperature of the endless belt is detected to collectively adjust the output from the group of heat generating parts, it is not possible to adjust the temperatures of a plurality of regions in the sheet width direction. Thus, in the first conventional technique, it is not possible to perform such control that the center portion in the sheet width direction provides high output and end portions provide low output because the sheet does not pass therethrough, while monitoring the detected temperatures of the respective center portion and end portions. That is, the first conventional technique has a possibility of making an improvement in that finer control can be performed to the amount of heat generation in the sheet width direction.

On the other hand, in a second conventional technique, a number of heat generating parts of the same width are formed and arranged in the sheet width direction. In the second conventional technique, on the rear surface of the ceramic substrate on which no heat generating parts are formed, a thermistor is brought into contact with a region across two heat generating parts in plan view that are located at the center in the sheet width direction and detects temperatures. In the second conventional technique, the output of the group of heat generating parts located at a location corresponding to the size of a sheet is collectively adjusted on the basis of the aforementioned detected temperature.

The second conventional technique detects one point on the ceramic substrate and collectively adjusts the output of the group of heat generating parts. Thus, in the second conventional technique, it is not possible to perform such control that the group of heat generating parts at the center portion in the sheet width direction provides high output and the groups of heat generating parts at end portions provide low output, while monitoring the detected temperature of the group of heat generating parts at the respective portions.

That is, the second conventional technique has a possibility of making an improvement in that finer control can be performed to the amount of heat generation in the sheet width direction.

In a third conventional technique, the widths of heat generating parts are different depending on the respective locations. Of the heat generating parts arranged side by side in the sheet width direction, the width of the first heat generating part at the center corresponds to the width of A5 size. The total value of the width of a pair of second heat generating parts located on both outer sides of the first heat generating part and the width of the first heat generating part is set to be equal to the width of A4 size. The total value of the width of a pair of third heat generating parts located on both outer sides of the second heat generating parts and the width of the first and second heat generating parts is set to be equal to the width of A4-R size.

In the third conventional technique, on the rear surface of the ceramic substrate on which no heat generating parts are formed, a thermistor is brought into contact with a location which overlaps each of the first to third heat generating parts in plan view and detects the temperature of each location. In the third conventional technique, the first to third heat generating parts provide output depending on the sheet size and the output is adjusted on the basis of the each detected temperature mentioned above.

In the third conventional technique, for the sheet of A5 size, the first heat generating part provides high output, while for the sheet of A4 size, the first and second heat generating parts (three heat generating regions) provide high output. In the third conventional technique, the heat generating regions on the ceramic substrate in the sheet width direction are roughly divided. However, the heat generating parts are one continuous resistive member, and thus no consideration is given to a configuration like a plurality of heat generating groups with gaps therebetween.

DETAILED DESCRIPTION

A heating device according to an embodiment generally includes heat generating parts, and temperature sensors. The heat generating parts are divided into a plurality of blocks, so that a plurality of heat generating parts are arranged with a gap therebetween on a substrate in each block. There are temperature detection regions in respective blocks, and the temperature sensors are provided corresponding to the heat generating parts with the gaps being avoided. The temperature sensors that are less in number than the plurality of heat generating parts detect the temperatures of the heat generating parts.

In general, an image forming apparatus according to an embodiment includes a fixing device. The fixing device includes: an endless rotational body; a heating member having a substrate and a plurality of heat generating parts which are divided into a plurality of blocks and which are arranged side by side in each block on the substrate with a gap between the heat generating parts, the heating member being provided on an inner side of the endless rotational body; temperature sensors which each have a temperature detection region provided in each of the blocks corresponding to the heat generating parts with the gap being avoided, the temperature sensors less in number than the heat generating parts detecting the temperatures of the heat generating parts; and a pressure element which faces the heating member via the endless rotational body and which forms a nip configured to press a sheet in conjunction with the endless rotational body. The fixing device is configured to fix an image transferred to a sheet onto the sheet.

An image forming apparatus and a fixing device according to an embodiment will now be described below with reference to the drawings.

First Embodiment

Figure 1:
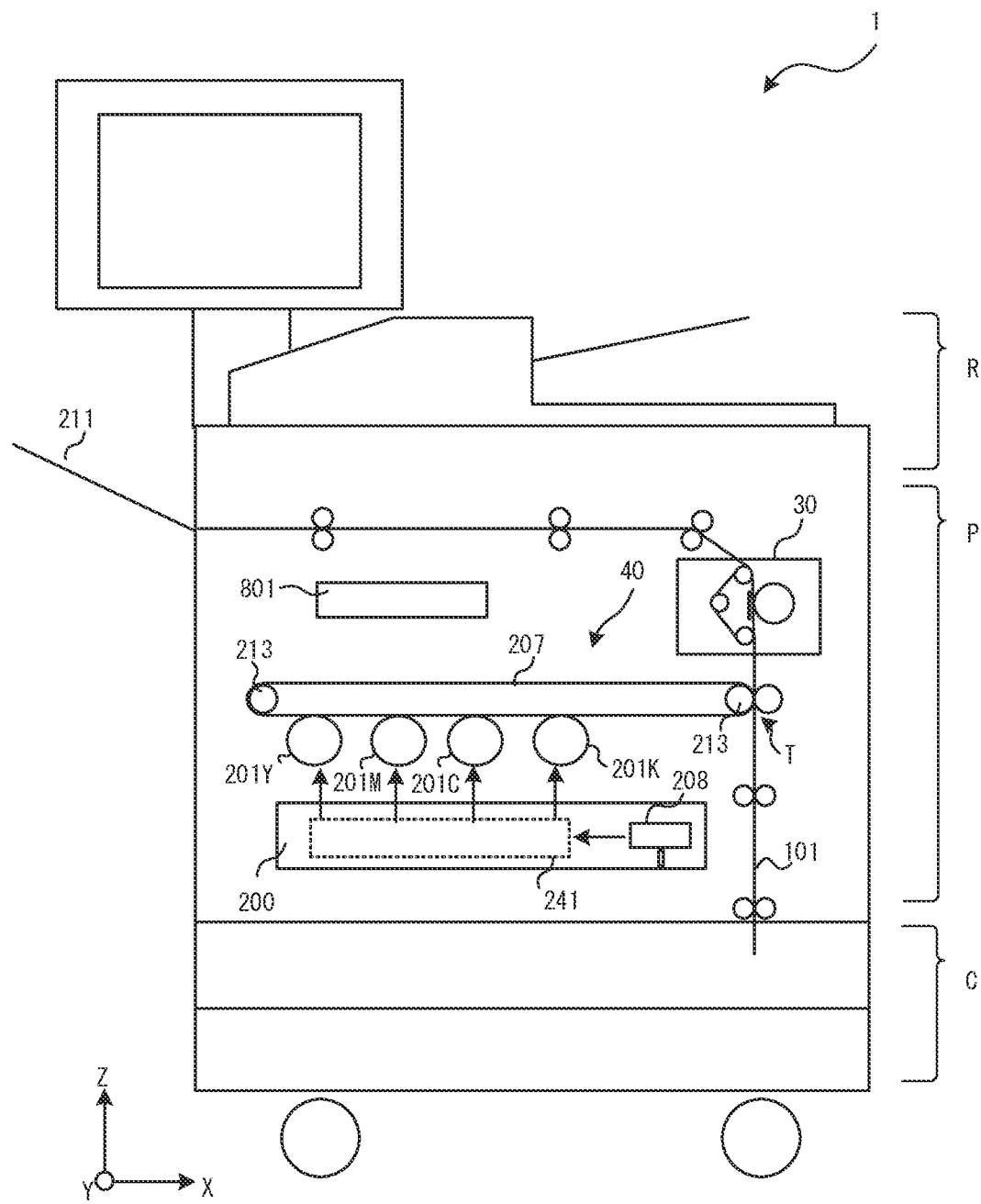
FIG. 1 is a diagram schematically illustrating an image forming apparatus according to an embodiment.

FIG. 1 is a schematic diagram illustrating an image forming apparatus according to an embodiment. The image forming apparatus 1 has a reading unit R, an image forming unit P, and a paper cassette unit C. The reading unit R reads a document sheet placed on a platen by a CCD (Charge-Coupled Device) image sensor to thereby convert an optical signal into digital data. The image forming unit P acquires a document image read in the reading unit R or print data from an external personal computer, and forms and fixes a toner image on a sheet.

The image forming unit P has a laser scanning section 200, and photoconductor drums 201Y, 201M, 201C, and 201K. The laser scanning section 200 has a polygon mirror 208 and an optical system 241. On the basis of image signals for colors of yellow (Y), magenta (M), cyan (C), and black (K), the laser scanning section 200 irradiates the photoconductor drums 201Y to 201K to provide an image to be formed on the sheet.

The photoconductor drums 201Y to 201K retain respective color toners supplied from a developing device (not shown) corresponding to the aforementioned irradiation locations. The photoconductor drums 201Y to 201K sequentially transfer the toner images being held onto a transfer belt 207. The transfer belt 207, which is an endless belt, is rotationally driven by a roller 213 to convey the toner image to a transfer location T.

A conveyance path 101 conveys a sheet stocked in the paper cassette unit C through the transfer location T, a fixing device 30, and an output tray 211 in this order. A sheet stocked in the paper cassette unit C is guided by the conveyance path 101 and conveyed to the transfer location T, and then the transfer belt 207 transfers the toner image to the sheet at the transfer location T.

The sheet having the toner image formed on a surface thereof is guided by the conveyance path 101 and conveyed to the fixing device 30. The fixing device 30 heats and melts the toner image to thereby allow the toner to be penetrated into and fixed onto the sheet. This can prevent the toner image on the sheet from being disturbed by an external force. The conveyance path 101 conveys the sheet on which the toner image is fixed to the output tray 211 so as to eject the sheet out of the image forming apparatus 1.

A controller 801 is a unit for controlling devices and mechanisms in the image forming apparatus 1 in a centralized manner. The controller 801 includes, for example, a central processor such as a central processing unit (CPU), and volatile and non-volatile memories. According to an embodiment, a central processor controls the devices and the mechanisms in the image forming apparatus 1 by executing programs stored in memories. Alternatively, the controller 801 may implement part of the functions as a circuit.

A configuration including the sections used for conveying an image (toner image) to be formed to the transfer location T and transferring the image onto the sheet is referred to as a transfer unit 40. The transfer unit 40 transfers the image to be formed onto the sheet.

Figure 2:
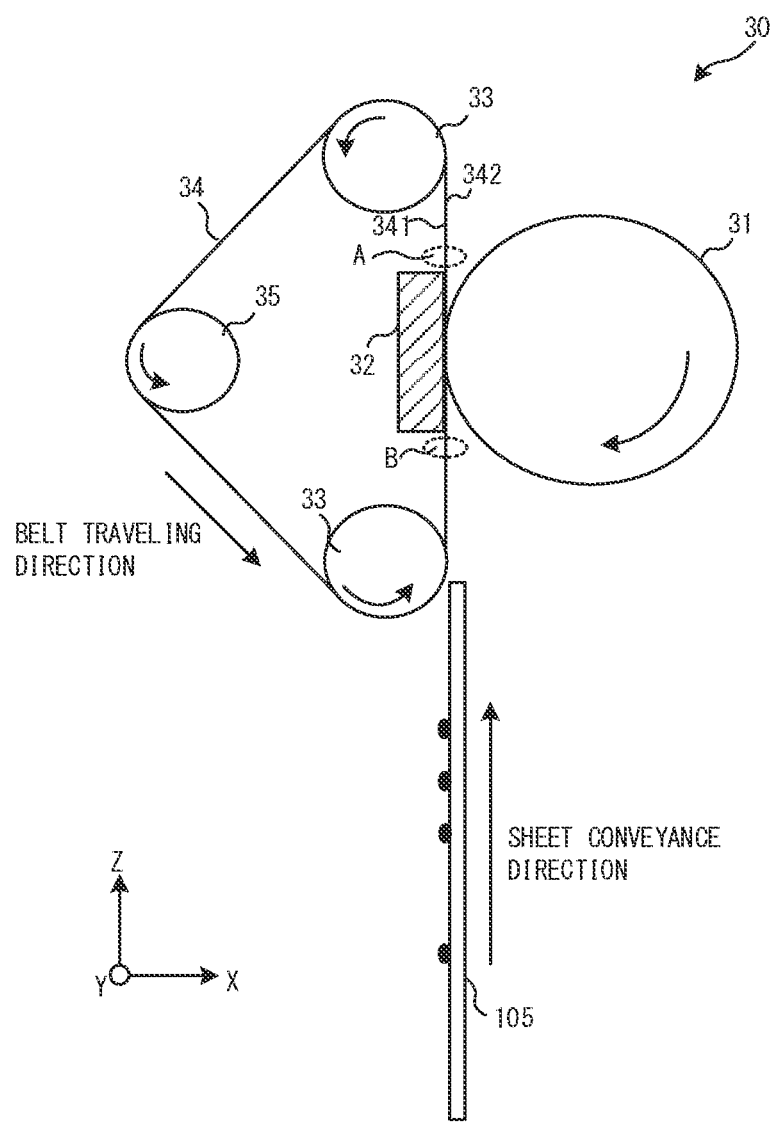
FIG. 2 is a diagram illustrating a configuration of a fixing device according to an embodiment.

FIG. 2 is a diagram illustrating a configuration example of the fixing device 30. The fixing device 30 fixes an image transferred to a sheet onto the sheet. The fixing device 30 has a plate-shaped heating member 32, and an endless belt 34 suspended by a plurality of rollers. Furthermore, the fixing device 30 has drive rollers 33 by which the endless belt 34 is suspended and which rotationally drive the endless belt in a certain direction. The fixing device 30 has a tension roller 35 by which the endless belt 34 is suspended and which imparts tension thereto. The fixing device 30 also has a pressure roller 31 (pressure element) with a surface having an elastic layer formed thereon.

The heating member 32 at its heat-generation side is in contact with the inner surface of the endless belt 34 and presses the endless belt 34 against the pressure roller 31. This configuration allows the heating member 32 and the pressure roller 31 to interpose a sheet 105 carrying a toner image in between a contact portion (nip portion) formed in conjunction with the pressure roller 31, and heat and pressurize the sheet 105.

The heating member 32 is configured such that a heat generating resistive layer (a heat generating resistive member 60 to be discussed later) is stacked on top of a ceramic substrate, and a protective layer formed from a heat-resistant member is stacked thereon. The protective layer is provided to prevent the ceramic substrate and the heat generating resistive layer from being in contact with the endless belt 34. This reduces the abrasion of the endless belt 34. The substrate on which the heat generating resistive layer is stacked is not limited to a ceramic substrate. The substrate on which the heat generating resistive layer is stacked preferably has a high thermal conductivity and a high insulating property.

The fixing device 30 has a plurality of temperature sensors 80 arranged side by side in the Y-axis direction (not shown in FIG. 2). In this embodiment, the temperature sensors 80 are incorporated into the heating member 32.

In this example, the ceramic substrate of the heating member 32 has a thickness of 1 to 2 mm, and the material of the protective layer is $SiO_2$ with a thickness of 60 to 80 µm. Furthermore, the endless belt 34 includes a base layer (Ni/SUS/PI with a thickness of 60 to 100 µm); an elastic layer (Si rubber with a thickness of 100 to 300 µm); and a release layer (PFA with a thickness of 15 to 50 µm) sequentially from the side in contact with the heating member 32. The thickness and the materials of respectively layers are shown by way of example only.

The endless belt 34 may also employ the rotation of the pressure roller 31 as the power source for the belt.

Figure 3:
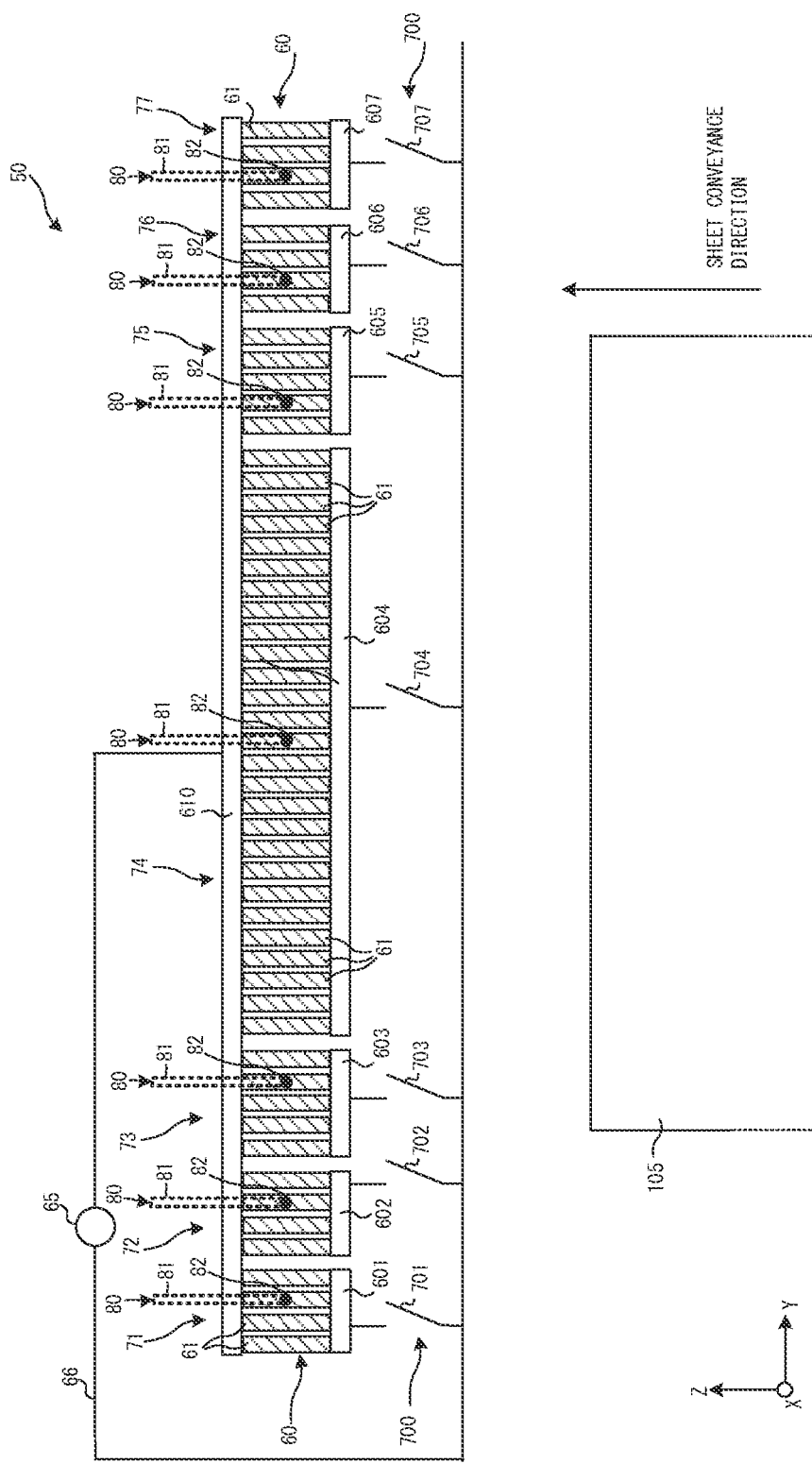
FIG. 3 is a diagram illustrating a configuration example of a heat generating mechanism of a fixing device according to an embodiment.

FIG. 3 is a diagram illustrating a mechanism for allowing the heating member 32 to generate heat. A heat generating mechanism 50 has the heat generating resistive member 60, a plurality of electrodes 601 to 607, and an integrated electrode 610. Furthermore, the heat generating mechanism 50 has a plurality of switching elements 701 to 707, a power source 65, and wiring 66. Note that the plurality of switching elements 701 to 707 are referred to as a switch unit 700.

The heat generating resistive member 60 is a plate-shaped member disposed so as to face a surface of the sheet 105 being conveyed, and constituted by a plurality of resistive members 61. The resistive members 61 are a plurality of small cell regions acquired by dividing the heat generating resistive member 60 in a direction perpendicular to the sheet conveyance direction (in the Y-axis direction). In this embodiment, each of the resistive members 61 has the same width in the Y-axis direction, but may have a different one.

One end of each of the resistive members 61 is connected to the electrode 610, and the other end is connected to one of the electrodes 601 to 607.

The electrode 610 and the electrodes 601 to 607 are formed from an aluminum layer. The electrode 610 or the one electrode is integrally formed, but the other electrode is divided into the electrodes 601 to 607 as illustrated. Here, the divisions of the resistive members 61 that are divided by the electrodes 601 to 607 are referred to as a block (blocks 71 to 77).

The electrodes 601 to 607 are connected to the switching elements 701 to 707, respectively. Turning the switching elements 701 to 707 ON/OFF will cause the resistive members 61 in the blocks 71 to 77 to be energized by the power source 65 and generate heat in each of the arrayed blocks 71 to 77.

In other words, the resistive members 61 (heat generating parts) are stacked on top of the ceramic substrate to be arrayed in the Y-axis direction (a first direction) and energized to generate heat. The plurality of resistive members 61 are divided into the plurality of blocks 71 to 77 and provided with power control for each of the blocks 71 to 77. In this embodiment, the blocks 71 to 77 each include a plurality of resistive members 61. However, at least one of the blocks 71 to 77 may only have to include a plurality of adjacent resistive members 61.

The locations of the blocks 71 to 77 and the lengths thereof in the Y-axis direction are specified on the basis of the standard size of the sheet. If the sheet 105 to be conveyed is of a small size, then heat primarily needs not to be generated at a location where the sheet does not pass through. In this embodiment, depending on the size of the sheet being conveyed, ON/OFF control is performed to each of the blocks 71 to 77. For example, when a small sheet of A5 size is heated, the block 74 (the first block) is turned ON and the other blocks are turned OFF. In the case of A4 size, for example, the blocks 73, 74, and 75 are turned ON, and the other blocks 71, 72, 76, and 77 are turned OFF. In the case of A3 size, for example, all the blocks 71 to 77 are turned ON. This energization control is performed by the switching elements 701 to 707 performing ON/OFF actions in response to the control by the controller 801. As described above, depending on the sheet size, control is performed to determine which blocks 71 to 77 of resistive members 61 are energized, thereby preventing unnecessary heat generation.

Note that the controller 801 collectively controls the outputs of the resistive members 61 in the blocks 71 to 77. The control performed by the controller 801 is not limited to the ON/OFF control of the output of the resistive members 61 in the blocks 71 to 77. As will be discussed later, the controller 801 may also collectively adjust (provide feedback control to) the output of the resistive members 61 in the blocks 71 to 77 so that the detected temperature by a temperature detection region 82 corresponding to each of the blocks 71 to 77 reaches a target temperature.

The controller 801 may also perform control so that the output of the blocks 71 to 77 that do not correspond to the sheet size is less than the output of the blocks 71 to 77 that correspond to the sheet size. For example, to heat a small sheet of A5 size, the controller 801 may perform control so that the block 74 provides high output, and the other blocks 71 to 73 and 75 to 77 may provide output that is less than that of the block 74.

In this embodiment, the sheet is conveyed so that the center of the sheet in the Y-axis direction passes the center of the group of the resistive members 61 in the Y-axis direction. The block 74 includes the group of the resistive members 61 that are located at the center of the group of the resistive members 61 in the Y-axis direction. The block 74 includes the group of the resistive members 61 in a region through which sheets of all sizes to be subjected to a fixing treatment (sheets of the minimum size to be subjected to a fixing treatment) pass. During the fixing treatment, the resistive members 61 of the other blocks 71 to 73 and 75 to 77 are turned OFF or reduced to low output when the sheet has a small size. The group of the resistive members 61 in the block 74 is controlled to provide high output (output for the fixing treatment).

Furthermore, to subject the sheet of A3 size to a fixing treatment, the controller 801 turns ON all the blocks 71 to 77 to provide high output. At this time, the controller 801 may perform control so that the detected temperatures of the respective blocks 71 to 77 are the same or may also perform control so that the target detected temperatures of the respective blocks 71 to 77 may differ.

Of the blocks 71 to 77, the block 74 (corresponding to A5 size) has the greatest number of resistive members 61. The resistive members 61 of the blocks 73 and 75 (corresponding to A4 size) on both sides of the block 74 are the same in number and the greatest next to the block 74. The resistive members 61 of the blocks 72 and 76 (corresponding to A3 size) which are located at both outer ends of the blocks 73 and 75 in the Y-axis direction and adjacent to the blocks 73 and 75 are the same in number and the least among the blocks 71 to 77. The resistive members 61 of the blocks 71 and 77 (corresponding to A3 size) which are located at both outer ends of the blocks 72 and 76 in the Y-axis direction and adjacent to the blocks 72 and 76 are the same in number, and the least among the blocks 71 to 77 and the same as the blocks 72 and 76 in number. The blocks 71 and 77 (the second block) are located on both ends in the Y-axis direction among the blocks 71 to 77. Note that the number of the blocks 71 to 77 can be set as appropriate.

Furthermore, in this embodiment, the temperature sensors 80 are provided in each of the blocks 71 to 77. The temperature sensors 80 detect the temperature of the resistive members 61 in each of the blocks 71 to 77, and then output the detected value to the controller 801.

The temperature sensors 80 are installed, one for each of the blocks 71 to 77, and provided with film-shaped thermistors 81. The thermistor 81 is disposed between the surface of the ceramic substrate, on which the resistive member 61 is formed, and the endless belt 34, and detects the temperature of the resistive member 61 at the distal end portion that is in contact with the resistive member 61. Hereafter, the region which is the distal end portion for detecting the temperature of the temperature sensor 80 and which is in contact with the resistive member 61 is referred to as the temperature detection region 82. In other words, the temperature detection region 82 can also be said to be a region of the ceramic substrate of which temperature is detected by the temperature sensor 80. The temperature detection region 82 of each of the temperature sensors 80 overlaps the resistive member 61 in the Y-axis direction in plan view.

In this embodiment, the temperature detection region 82 of each of the temperature sensors 80 has a width in the Y-axis direction less than the width of the resistive member 61 and is located inside the width of the resistive member 61 in plan view. The temperature detection region 82 of each of the temperature sensors 80 may only have to overlap the resistive member 61 in the Y-axis direction in plan view, and may be located partially outside the resistive member 61. The temperature detection region 82 of each of the temperature sensors 80 may have a width in the Y-axis direction longer than the width of the resistive member 61, and the center thereof in the Y-axis direction may only have to overlap the resistive member 61 in the Y-axis direction in plan view.

Figure 4:
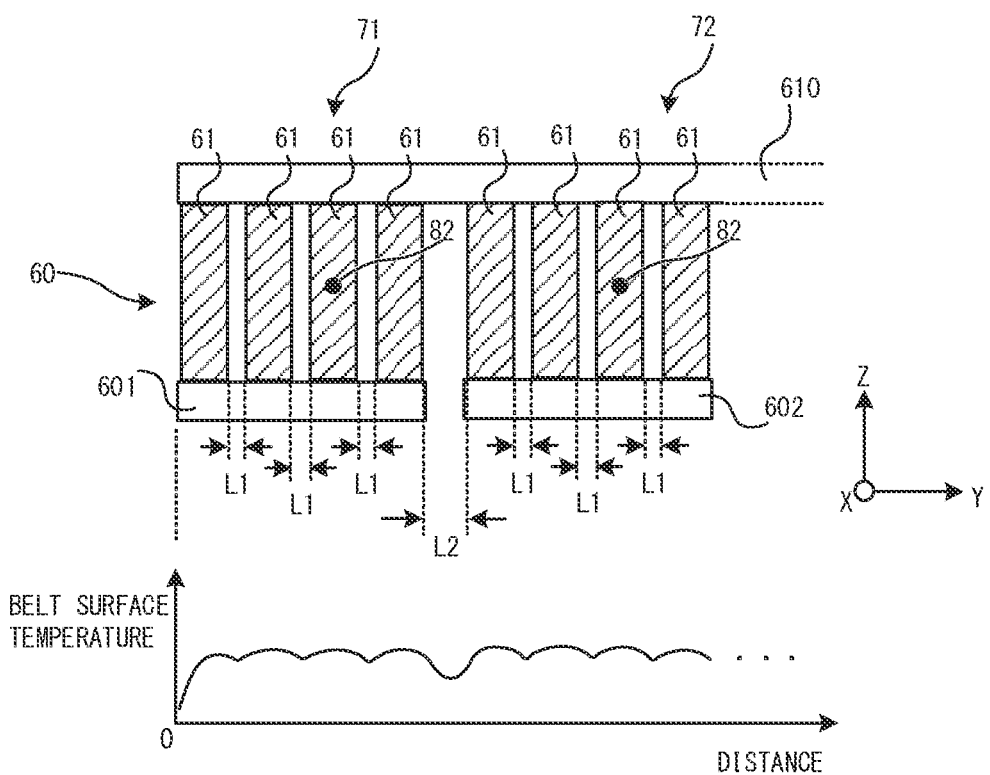
FIG. 4 is an expanded diagram illustrating the heat generating mechanism shown in FIG. 3 and a diagram showing an example of a temperature distribution.

The upper part of FIG. 4 is an enlarged diagram illustrating the vicinity of the blocks 71 and 72, and the lower part is a diagram schematically illustrating a temperature distribution. The vertical axis of the temperature distribution represents the temperature transferred to the endless belt 34, and the horizontal axis represents the distance from an end of the heat generating resistive member 60.

As shown in the upper part of FIG. 4 and in FIG. 3 above, there is provided a gap of a specified length L1 between the resistive members 61 in the blocks 71 to 77. This gap is referred to as the gap L1 as required. The length of the gap L1 may be changed depending on the size and the material of the resistive members 61. As shown in the lower part of FIG. 4, the temperature at the location of a gap is lower than the temperature at the location of the resistive member 61. As the gap L1 increases (becomes longer), this tendency becomes noticeable, causing an increase in temperature differences (variations in heat generation) on the temperature distribution graph.

Furthermore, in this embodiment, there is also provided a gap of a specified length L2 between the blocks 71 to 77. This gap will be referred to as a gap L2 as required. The gap L2 is longer than the gap L1 inside the blocks 71 to 77. This is because a certain distance has to be provided between the blocks 71 to 77 in order to prevent leakage therebetween. This length of the gap L2 may also be changed depending on the size, the material, and the voltage value of the resistive members 61. As described above, as shown in the lower part of FIG. 4, since the gap L2 is longer, the temperature at the location of a gap having a gap length of L2 between the blocks 71 to 77 is much lower than the temperature at the location of a gap inside the blocks 71 to 77 (gap length=L1). Note that in this embodiment, in the Y-axis direction, the widths of the gaps L1 and L2 are less than the width of the resistive member 61, but may also be greater than the width of the resistive member 61.

On the other hand, in the temperature distribution graph shown in the lower part of FIG. 4, the temperature is further lowered at an end portion of the heat generating resistive member 60 (in the vicinity of reference 0) because heat escapes out of the heat generating resistive member 60.

Figure 5:
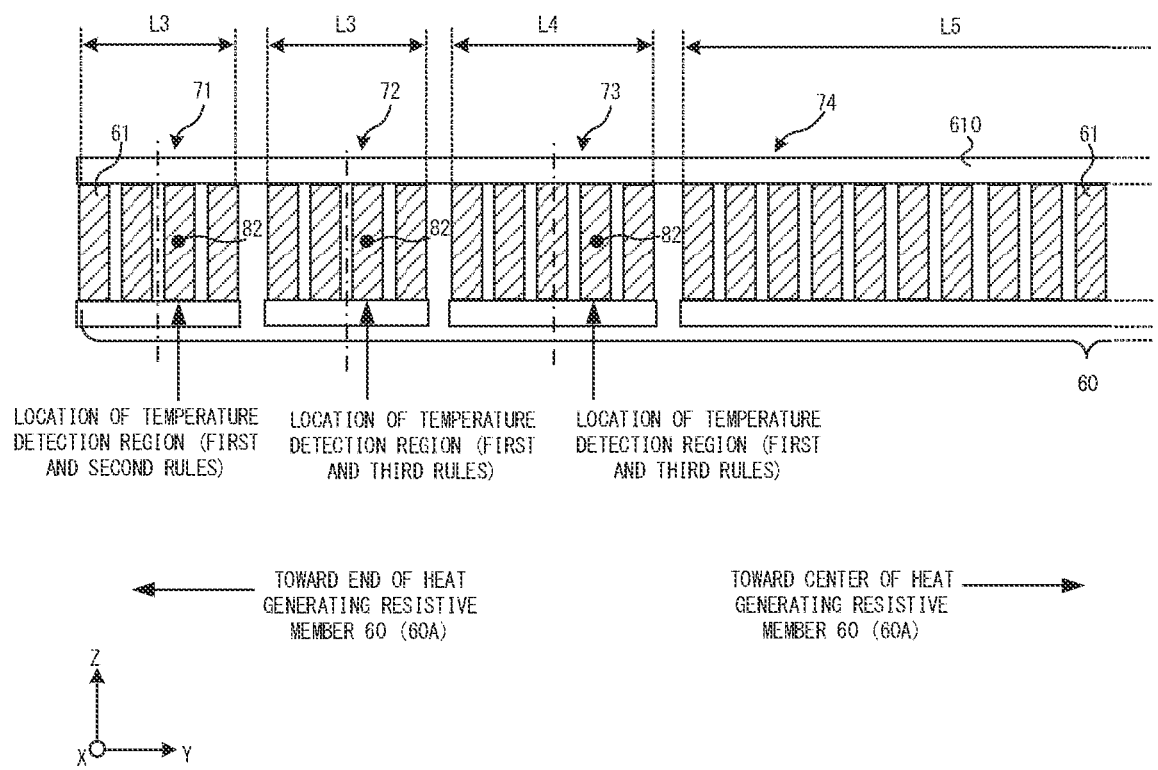
FIG. 5 is a diagram illustrating an example location of a temperature sensor.

In such a temperature distribution, it is necessary to detect temperatures with greater accuracy. Referring to FIG. 5, a description will be given of at which location the temperature detection regions 82 are set.

First, the temperature detection regions 82 are set neither on the gap L1 between the resistive members 61 nor on the gap L2 between the blocks 71 to 77. That is, the temperature detection region 82 is set at a location where the region overlaps the resistive member 61 in the Y-axis direction. This setting rule will be referred to as the first rule. Furthermore, in this embodiment, the temperature detection region 82 is set at a location inside the resistive member 61 in the Y-axis direction. Since the temperature at the gaps L1 and L2 is lowered as described above, the temperature cannot be detected with accuracy. Therefore, the first rule is provided as a setting rule for the temperature detection regions 82. Note that when the length of the temperature detection region 82 in the Y-axis direction (hereafter, as required, the length of a member in the Y-axis direction will be referred to as the width or the width length) is physically longer than the width of the resistive member 61, at least the center of the temperature detection region 82 in the Y-axis direction is located inside the resistive member 61.

Then, in the block 71 at an end of the heat generating resistive member 60, the temperature detection region 82 is set to be closer to the center of the heat generating resistive member 60 (closer to the block 74 at which high output is always provided during the fixing treatment) than to the center in the block 71 (indicated by an alternate long and short dashed line). The same holds true for the block 77 at the other end that is not shown in FIG. 5 (see FIG. 3). This setting rule will be referred to as the second rule. As described above, on the end sides of the heat generating resistive member 60, since heat escapes outwardly causing the temperature to be lowered, it is not possible to measure the temperature with accuracy. Therefore, at the end blocks 71 and 77, in order to avoid the influence of lowered temperatures as much as possible, at least the temperature detection region 82 is set to be closer to the center of the heat generating resistive member 60 than to the center of in the blocks 71 and 77.

Furthermore, in this embodiment, a comparison is made between the width lengths of the blocks 71 to 77 on both sides that are adjacent to the blocks 71 to 77 of interest (focused block) to which the temperature detection region 82 is to be set, and then the temperature detection region 82 is set so as to be closer to the longer one. This setting rule will be referred to as the third rule. For example, in the case where the block 72 is assumed to be a focused block and the temperature detection region 82 is set to the block 72, the respective widths of the blocks 71 and 73 on both adjacent sides, that is, L3 and L4 of FIG. 5 will be compared with each other. In this example, since L4 is longer, the temperature detection region 82 is set in the block 72 to a location that is closer to the block 73 than to the center of the block 72 (indicated by an alternate long and short dashed line). The same holds true for the case where the temperature detection region 82 is set assuming that the block 73 is a focused block. In this case, the respective widths of the blocks 72 and 74 on both sides, that is, L3 and L5 are compared with each other, and then since L5 is longer, the temperature detection region 82 is set to a location that is closer to the block 74. According to the third rule mentioned above, since the temperature detection region 82 of the focused block 72 is set to be closer to the block 73 that will generate a greater amount of heat, for example, when compared with the setting at the center of the block 72, it is possible to detect temperatures closer to an average in the temperature gradient in the Y-axis direction within the block 72.

In the blocks 75 and 76 not shown in FIG. 5, the temperature detection region 82 is set according to the third rule (see FIG. 3). Note that since the block 74 is not at an end of the heat generating resistive member 60 and the blocks 73 and 75 on both sides have the same length, only the first rule is applied. In this embodiment, concerning the block 74, since the block 74 is located at the center of the heat generating resistive member 60, the temperature detection region 82 is to be set at the center of the block 74 (see FIG. 3). More specifically, when the number of the resistive members 61 included in the block 74 is an odd number, the temperature detection region 82 is set at a location that overlaps the resistive member 61 at the center in the Y-axis direction in plan view. When the number of the resistive members 61 included in the block 74 is an even number, the temperature detection region 82 is set to a location that overlaps either one of the two resistive members 61 at the center in the Y-axis direction in plan view.

Figure 6:
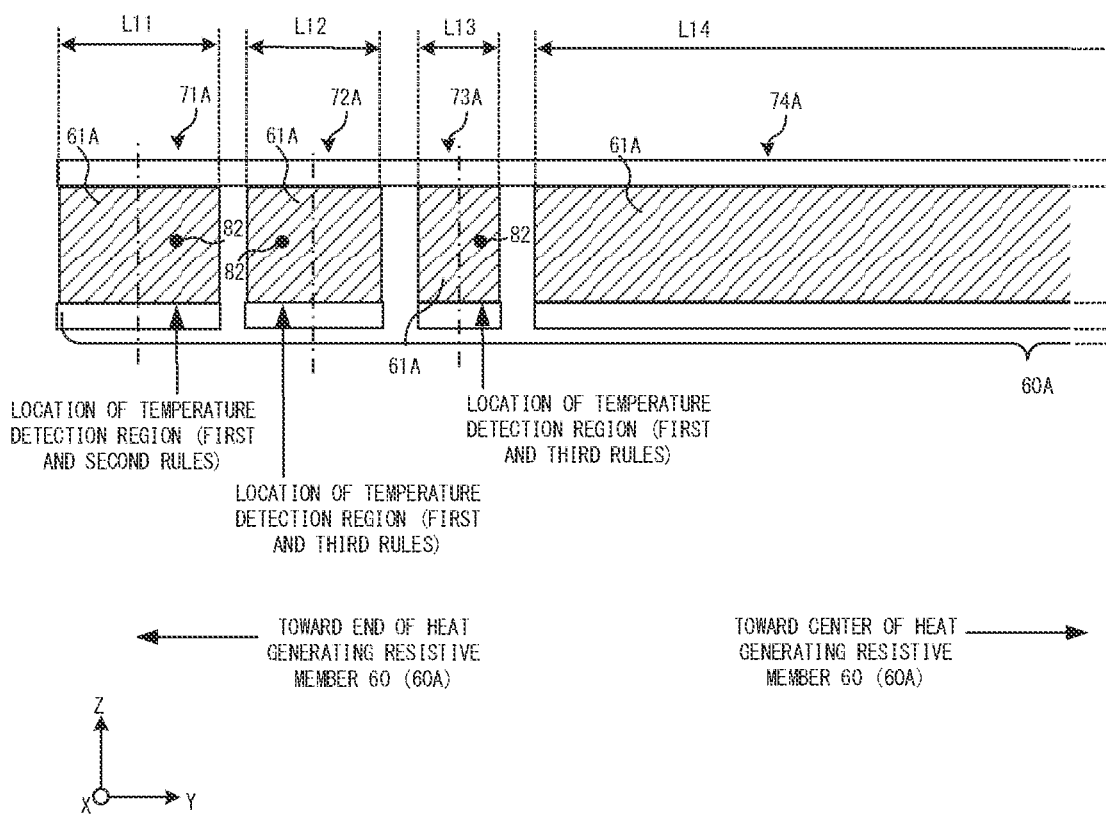
FIG. 6 is a diagram illustrating an example location of a temperature sensor.

In the examples of FIGS. 3 to 5, the width of the block 74 at the center of the heat generating resistive member 60 is longer, and the width is reduced toward both ends. Furthermore, the heat generating resistive member 60 is configured to be divided into a plurality of smaller groups of resistive members 61. Other than this configuration, the configuration with one resistive member per block and the configuration with no rule for the width may also be conceivable. FIG. 6 illustrates an example. FIG. 6 illustrates blocks 71A, 72A, 73A, and 74A having the width lengths of L11, L12, L13, and L14, respectively. Note that in this example, illustrated are only the blocks 71A to 74A where those blocks similar to the blocks 71 to 77 of the first embodiment are found. The width lengths of the respective blocks 71A to 74A have the relation below:

L14>L11>L12>L13.

Furthermore, unlike those in FIGS. 3 to 5, a heat generating resistive member 60A is divided only in blocks, so that one object, that is, one resistive member 61A is found in the blocks 71A to 74A.

In such a configuration example, the temperature detection region 82 is set according to the first to third rules mentioned above. In particular, for the block 72A, the temperature detection region 82 is set to be closer to an end of the heat generating resistive member 60 than to the center in the block 72A.

In this example, the highest priority is placed on the first rule, the next highest priority on the second rule, and finally the lowest priority on the third rule. However, no limitation is imposed on this.

Note that in the first embodiment, the temperature sensor 80 may be configured such that the temperature detection region 82 is in contact with a location which overlaps the resistive member 61 in plan view on the rear surface opposite to the front surface of the ceramic substrate where the resistive member 61 is formed. Still in this case, since the region of the ceramic substrate indicative of the temperature of the resistive members 61 can be detected, the controller 801 can employ the detected temperature to control the blocks 71 to 77 to which the resistive members 61 belong. Furthermore, the temperature sensor 80 may also be a contact type sensor that includes a bimetal or thermocouple other than the thermistor 81. The temperature sensor 80 may detect temperatures in a noncontact fashion using an infrared radiation, in the case of which the temperature detection region 82 is a temperature detection region of the temperature sensor 80 for the ceramic substrate.

In the first embodiment, temperatures are detected for each of the blocks 71 to 77 into which a plurality of resistive members 61 are divided, so that power control is performed to the resistive members 61 collectively in each of the blocks 71 to 77. Thus, in the first embodiment, it is possible to appropriately control the amount of heat generation in the Y-axis direction in which the resistive members 61 are arranged.

Conventionally, as in Patent Literature 2, when there are a pair of heat generating parts at the center of a heat generating region with a gap interposed therebetween, a temperature detection region was set to overlap the pair of heat generating parts across the gap. In this case, since the region of the gap at which the gap is located at the center of the temperature detection region is lower in temperature than the region of the heat generating parts, there is a possibility of improving the accuracy of temperature detection.

In the first embodiment, it is possible to improve the accuracy of temperature detection because the temperature detection region 82 is set at a location inside the resistive member 61 in the Y-axis direction. That is, although a plurality of resistive members 61 are arranged side by side with the gap L1 therebetween, it is possible to appropriately detect temperatures without being affected by a temperature change (temperature degradation) caused by the gap in the Y-axis direction.

Conventionally, as in Patent Literatures 2 and 3, the amount of heat generation of a heat generating part was detected on the rear surface of the ceramic substrate. In this case, since the temperature of the heat generating part is detected via the ceramic substrate, there is a possibility of improving the accuracy of temperature detection.

In the first embodiment, since the temperature of the resistive members 61 is detected on the front surface of the ceramic substrate on which the resistive members 61 are formed, it is possible to improve the accuracy of temperature detection in this regard.

Second Embodiment

In the second embodiment, referring to FIG. 2, the temperature sensor 80 is to detect a region A downstream of the heating member 32 on the endless belt 34. However, a region B upstream of the heating member 32 may also be detected. In the second embodiment, the temperature sensor 80 is to detect the temperature of the inner surface 341 of the endless belt 34. However, the temperature of the outer surface 342 of the endless belt 34 may also be detected.

Figure 7:
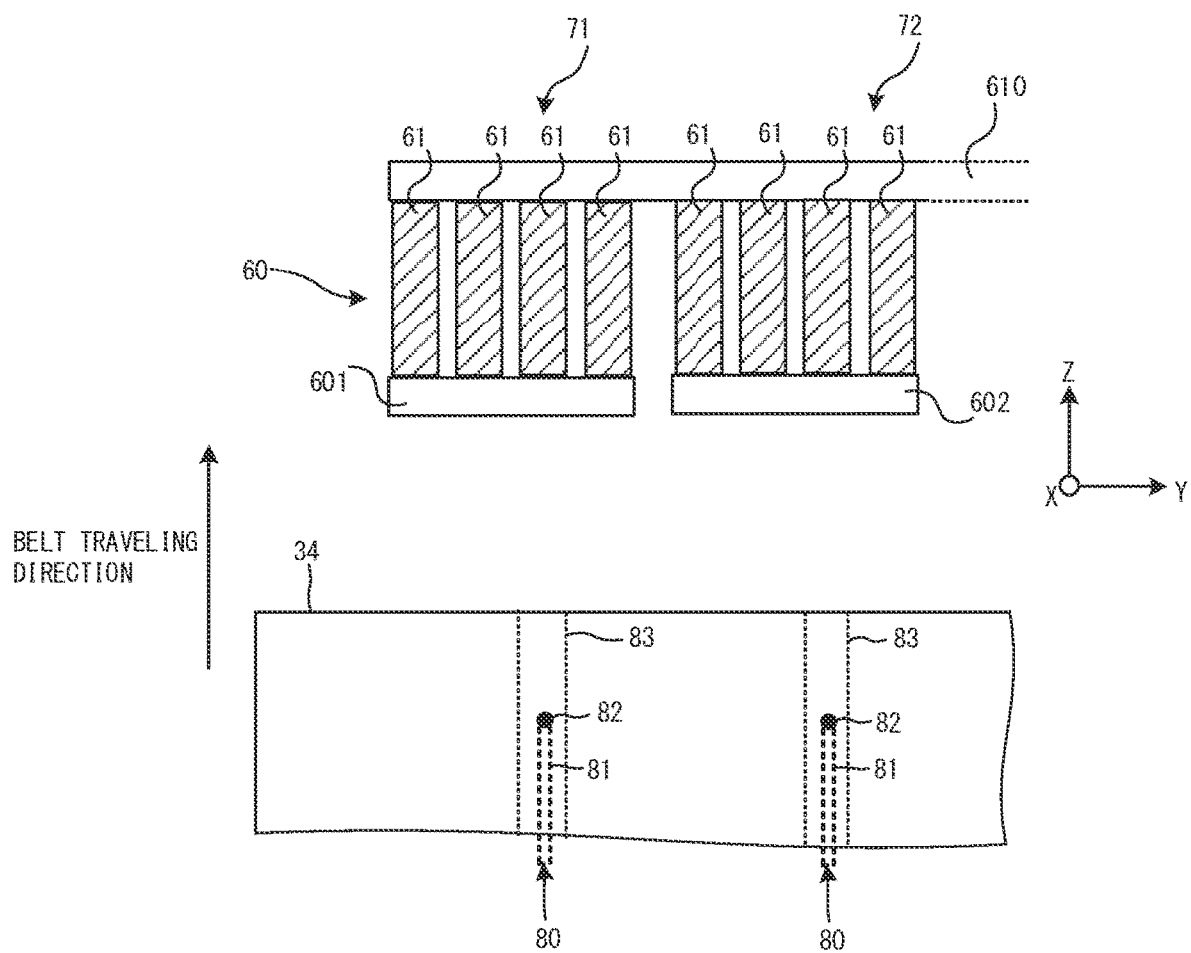
FIG. 7 is a diagram illustrating a temperature detection region set on an endless belt according to a second embodiment.

FIG. 7 illustrates the temperature detection regions 82 that are set on the endless belt 34.

A plurality of temperature sensors 80 are provided in the Y-axis direction corresponding to the blocks 71 to 77. The temperature sensors 80 are configured in the same manner as in the first embodiment and provided with the thermistors 81. Each temperature detection region 82 of the thermistors 81 overlaps, in the Y-axis direction, a region 83 opposed to the resistive member 61 on the endless belt 34 heated by the resistive member 61 (a heated body) (the first rule). Furthermore, in the second embodiment, each temperature detection region 82 is located within the region 83 opposed to the resistive member 61 on the endless belt 34.

The second embodiment is different from the first embodiment in that each temperature detection region 82 is set not on the ceramic substrate but on the endless belt 34 to be heated by being brought into contact with the ceramic substrate. The other configuration of the second embodiment is the same as that of the first embodiment. The setting rule of each temperature detection region 82 is the same as that of the first embodiment.

Third Embodiment

Figure 8:
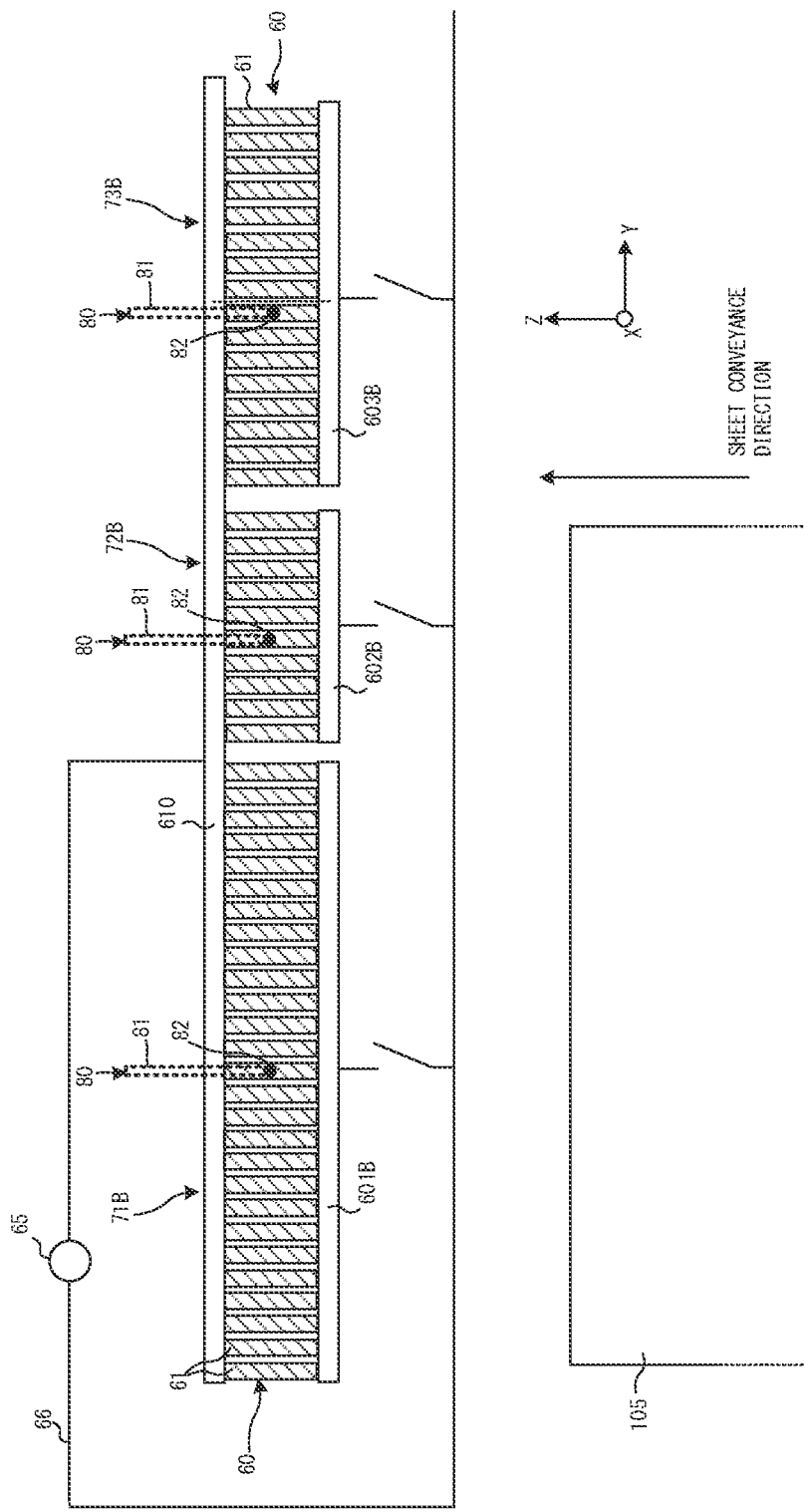
FIG. 8 is a diagram illustrating blocks of resistive members of a modified example according to a third embodiment.

FIG. 8 is a diagram illustrating blocks 71B to 73B of resistive members 61 according to a modified example.

In the third embodiment, a sheet is conveyed while being shifted toward one end of the group of the resistive members 61 in the Y-axis direction (to the left in FIG. 8).

Of the blocks 71B to 73B, the block 71B (corresponding to A5 size) which is on one endmost side in the Y-axis direction includes the largest number of resistive members 61. The block 72B (corresponding to A4 size) adjacent to the block 71B includes the lowest number of resistive members 61 among the blocks 71B to 73B. The block 73B (corresponding to A3 size) which is located on the other endmost side of the block 72B in the Y-axis direction and adjacent to the block 72B includes the resistive members 61 the number of which is less than that of the block 71B and greater than that of the block 72B. Note that the number of the blocks 71 to 77 can be appropriately set.

To heat the sheet of A5 size, the controller 801 turns ON the block 71B (the first block) and turns OFF the blocks 72B and 73B. In the case of A4 size, the controller 801 turns ON the blocks 71B and 72B and turns OFF the block 73B. In the case of A3 size, the controller 801 turns ON all the blocks 71B to 73B. The controller 801 may also perform control so that the output of the blocks 71B to 73B that do not correspond to the sheet size is less than the output of the blocks 71B to 73B that correspond to the sheet size.

The temperature detection region 82 of the thermistor 81 of the temperature sensors 80 is set on the basis of the same first to third rules as those of the first embodiment. That is, the temperature detection region 82 is set to a location that overlaps the resistive member 61 in the Y-axis direction (the first rule). Furthermore, in this embodiment, the temperature detection region 82 is set to a location that is inside the resistive member 61 in the Y-axis direction.

In the block 73B that is located on the other endmost side of the block 72B in the Y-axis direction, the temperature detection region 82 is set to be closer to the block 71B, which provides high output all the time during the fixing treatment, than to the center in the block 73B (indicated by an alternate long and short dashed line) (the second rule).

Furthermore, the width lengths of both the blocks 71B and 73B adjacent to the block 72B are compared with each other, and then in the block 72B that is a focused block, the temperature detection region 82 is set to be closer to the longer one (the third rule).

In this example, the highest priority is placed on the first rule, the second highest priority on the second rule, and the third priority on the third rule, which are not limitative. Furthermore, in the aforementioned embodiment, though the second rule and the third rule are described individually, these may be combined. In other words, two temperature detection regions 82 may be provided in one block, with one disposed at a location for the second rule, and the other disposed at a location for the third rule. Note that in a heating device with a plurality of blocks arrayed as with the embodiments, heat transferred from an adjacent block exerts an influence on temperature detection and temperature control. However, according to the second rule and the third rule mentioned above and a combination thereof, the location of the temperature detection region is set by taking into account the heat transferred from an adjacent block, thereby enabling more appropriate temperature control.

Fourth Embodiment

Figure 9:
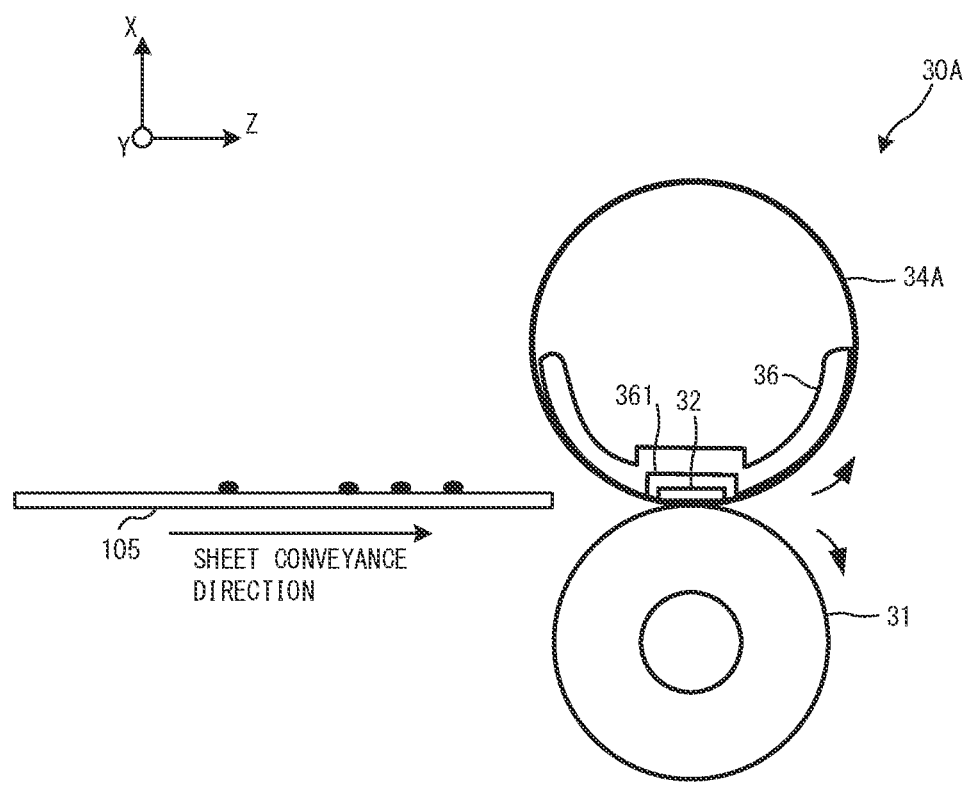
FIG. 9 is a diagram illustrating a configuration of a fixing device according to a fourth embodiment.

In a fourth embodiment, a description will be given of an exemplary aspect in which the configuration of the fixing device of the first embodiment is modified. FIG. 9 is a diagram illustrating a configuration example of the fixing device 30A.

A film guide 36 is semi-cylindrical, and accommodates the heating member 32 in a recessed portion 361 on the outer circumferential surface.

A fixing film 34A (belt) is an endless rotational belt. The fixing film 34A is fitted over the outer circumferential surface of the film guide 36. The fixing film 34A is interposed and held between the film guide 36 and the pressure roller 31 and driven by the rotation of the pressure roller 31.

The aforementioned heating member 32 is in contact with the fixing film 34A and heats the fixing film 34A.

A sheet 105 on which a toner image is formed is conveyed between the fixing film 34A and the pressure roller 31. The fixing film 34A heats the sheet and fixes the toner image on the sheet onto the sheet.

The aspect of the heating member 32 according to the first embodiment can also be applied to the fixing device 30A of the fourth embodiment. Note that the thermistor 81 of the temperature sensor 80 (not shown in FIG. 9) is disposed between the fixing film 34A and the heating member 32, and the temperature detection region 82 is set according to the aspect of the first embodiment.

Note that the thermistor 81 may also be in contact with the rear surface of the ceramic substrate (the heating member 32) on which no resistive members 61 are formed. The temperature detection region 82 is set according to the aspect of the first embodiment. For example, by following the first rule, the temperature detection region 82 is set to a location that overlaps the resistive member 61 in the Y-axis direction in plan view. Furthermore, in the fourth embodiment, the temperature detection region 82 is set to a location that is inside the resistive member 61 in the Y-axis direction in plan view.

As described in detail above, in the heating device of the embodiment in which a plurality of heat generating parts are arranged side by side with a gap therebetween, the amount of heat generation can be appropriately controlled by performing appropriate temperature detection without being influenced by temperature variations caused by the gaps in the direction in which the plurality of heat generating parts are arranged.

In each of the aforementioned embodiments, a description was given of the fixing devices 30 and 30A, as examples of a heating device, for performing the fixing treatment. However, the heating device (the fixing devices 30 and 30A) may also perform a decolorization treatment in which a sheet is heated to decolor an image on the sheet. In this case, it is assumed that the image is formed by a decolorable colorant that can be decolorized by heating. Furthermore, for example, the heating device may also be used for a treatment to uniformly heat and dry a panel, and those to be heated by the heating device are not limited to a sheet.

While certain embodiments have been described, these embodiments have been presented by way of example only, and are not intended to limit the scope of invention. Indeed, the novel apparatus, methods and system described herein may be embodied in a variety of other forms; furthermore, various omissions, substitutions and changes in the form of the apparatus, methods and system described herein may be made without departing from the spirit of the inventions. The accompanying claims and their equivalents are intended to cover such forms or modifications as would fall within the scope and spirit of the inventions.

What is claimed is:

1. A heating device, comprising:
a substrate;
a plurality of blocks that are arranged on the substrate with a gap therebetween in a first direction and that generate heat; and
a plurality of temperature sensors that are provided for each of the blocks and detect the temperature of the blocks, wherein
the blocks include a plurality of first blocks on at least one side in the first direction, and each first block is adjacent to two blocks in the first direction, and the temperature sensors for each first block detects a temperature of a temperature detection region on the respective first block, the temperature detection region being closer to the one of the adjacent two blocks that is a longer one of the two adjacent blocks in the first direction.

2. The heating device according to claim 1, wherein the first blocks are adjacent along the first direction.

3. The heating device according to claim 1, wherein the blocks include a second block that is the longest in the first direction among the blocks and located in the center of the plurality of blocks along the first direction, and a third block that is shorter in the first direction than the second block, and
the temperature detection region of the third block is closer to the second block than the center position of the third block along the first direction.

4. The heating device according to claim 1, comprising:
a first electrode provided along the first direction; and
a second electrode provided along the first direction and separated from the first electrode in a second direction orthogonal to the first direction, wherein
the blocks are connected to the first electrode at a first end in the second direction, and connected to the second electrode at a second end in the second direction, and are longer in the second direction than any of the first electrode and the second electrode.

5. The heating device according to claim 4, wherein the second electrode is divided corresponding to the blocks.

6. The heating device according to claim 1, wherein each temperature sensor in the plurality of temperature sensors has a film-shaped thermistor that contacts the respective block to detect temperature.

7. The heating device according to claim 6, wherein a surface of the substrate on which the blocks are formed faces an inner side of an endless rotational belt, and the thermistor is located between the endless rotational belt and the surface of the substrate.

8. A fixing device for fixing an image onto a sheet, the fixing device comprising:
an endless rotational belt;
a heating member including a substrate, a plurality of blocks that are arranged on the substrate with a gap therebetween in a first direction and that generate heat, the heating member being provided on an inner side of the endless rotational belt; and
a plurality of temperature sensors that are provided for each of the blocks and detect the temperature of the blocks,
a pressure roller configured to face the heating member via the endless rotational belt and to form a nip with the endless rotational belt, wherein
the blocks include a plurality of first blocks on at least one side in the first direction, and each first block is adjacent to two blocks in the first direction, and the temperature sensors for each first block detects a temperature of a temperature detection region on the respective first block, the temperature detection region being closer to the one of the adjacent two blocks being that is a longer one of the two adjacent blocks in the first direction.

9. The fixing device according to claim 8, wherein the first blocks are adjacent along the first direction.

10. The fixing device according to claim 8, wherein the blocks include a second block that is the longest in the first direction among the blocks and located in the center of the plurality of blocks along the first direction, and a third block that is shorter in the first direction than the second block, and
the temperature detection region of the third block is closer to the second block than the center position of the third block along the first direction.

11. The fixing device according to claim 8, comprising:
a first electrode provided along the first direction; and
a second electrode provided along the first direction and separated from the first electrode in a second direction orthogonal to the first direction, wherein
the blocks are connected to the first electrode at a first end in the second direction, and connected to the second electrode at a second end in the second direction, and are longer in the second direction than any of the first electrode and the second electrode.

12. The fixing device according to claim 11, wherein the second electrode is divided corresponding to the blocks.

13. The fixing device according to claim 8, wherein each temperature sensor in the plurality of temperature sensors has a film-shaped thermistor that contacts the respective block to detect temperature.

14. The fixing device according to claim 13, wherein a surface of the substrate on which the blocks are formed faces an inner side of the endless rotational belt, and the thermistor is located between the endless rotational belt and the surface of the substrate.

15. An image forming apparatus, comprising:
a fixing device, the fixing device comprising:
an endless rotational belt;
a heating member including a substrate, a plurality of blocks that are arranged on the substrate with a gap therebetween in a first direction and that generate heat, the heating member being provided on an inner side of the endless rotational belt; and
a plurality of temperature sensors that are provided for each of the blocks and detect the temperature of the blocks,
a pressure roller configured to face the heating member via the endless rotational belt and to form a nip with the endless rotational belt, the fixing device being configured to fix an image onto a sheet, wherein
the blocks include a plurality of first blocks on at least one side in the first direction, and each first block is adjacent to two blocks in the first direction, and the temperature sensors for each first block detects a temperature of a temperature detection region on the respective first block, the temperature detection region being closer to the one of the adjacent two blocks that is a longer one of the two adjacent blocks in the first direction.

16. The image forming apparatus according to claim 15, wherein
the first blocks are adjacent along the first direction.

17. The image forming apparatus according to claim 15, wherein
the blocks include a second block that is the longest in the first direction among the blocks and located in the center of the plurality of blocks along the first direction, and a third block that is shorter in the first direction than the second block, and
the temperature detection region of the third block is closer to the second block than the center position of the third block along the first direction.

18. The image forming apparatus according to claim 15, comprising:
a first electrode provided along the first direction; and
a second electrode provided along the first direction and separated from the first electrode in a second direction orthogonal to the first direction, wherein
the blocks are connected to the first electrode at a first end in the second direction, and connected to the second electrode at a second end in the second direction, and are longer in the second direction than any of the first electrode and the second electrode.

19. The image forming apparatus according to claim 18, wherein
the second electrode is divided corresponding to the blocks.

20. The image forming apparatus according to claim 15, wherein
each temperature sensor in the plurality of temperature sensors has a film-shaped thermistor that contacts the respective block to detect temperature.

* * * * *